Figure 2:
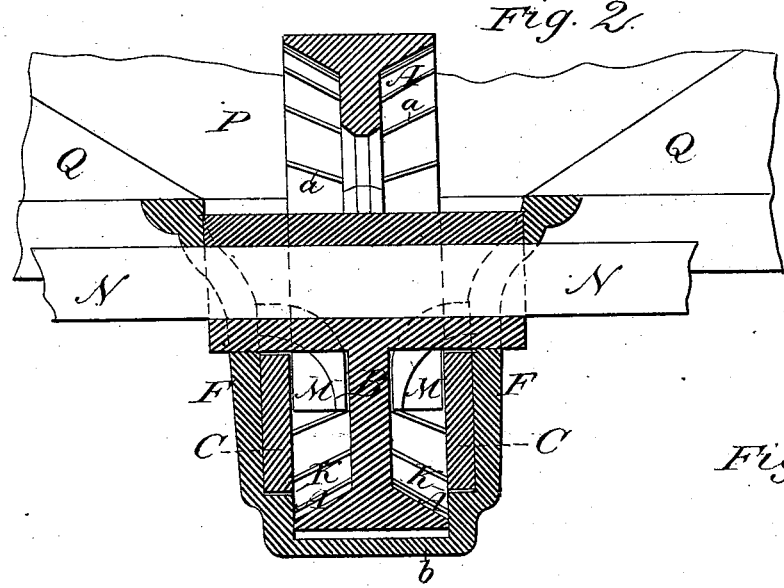

2 Sheets—Sheet 1.
D. BERLEW.
Feed-Cup for Grain-Drill.
No. 226,963. Patented April 27, 1880.
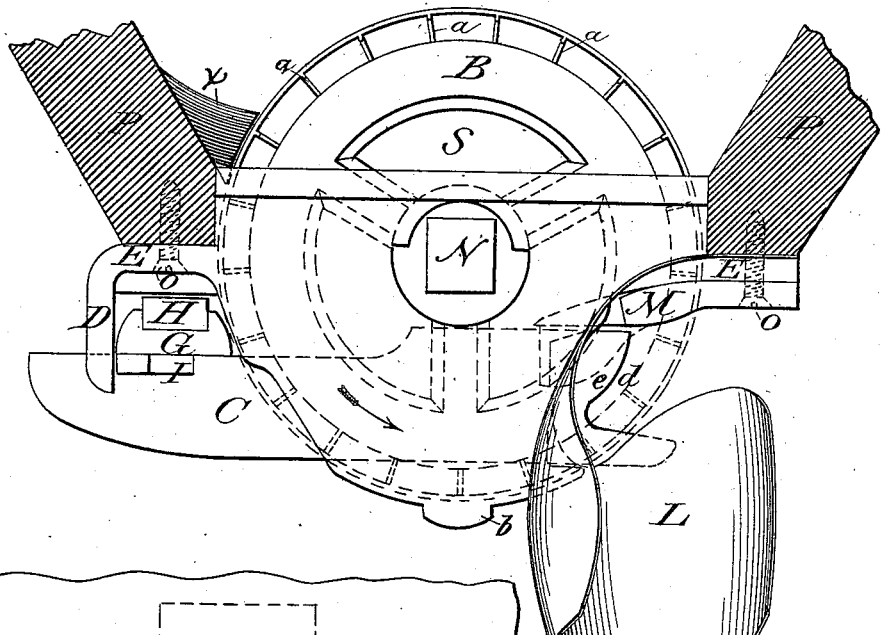
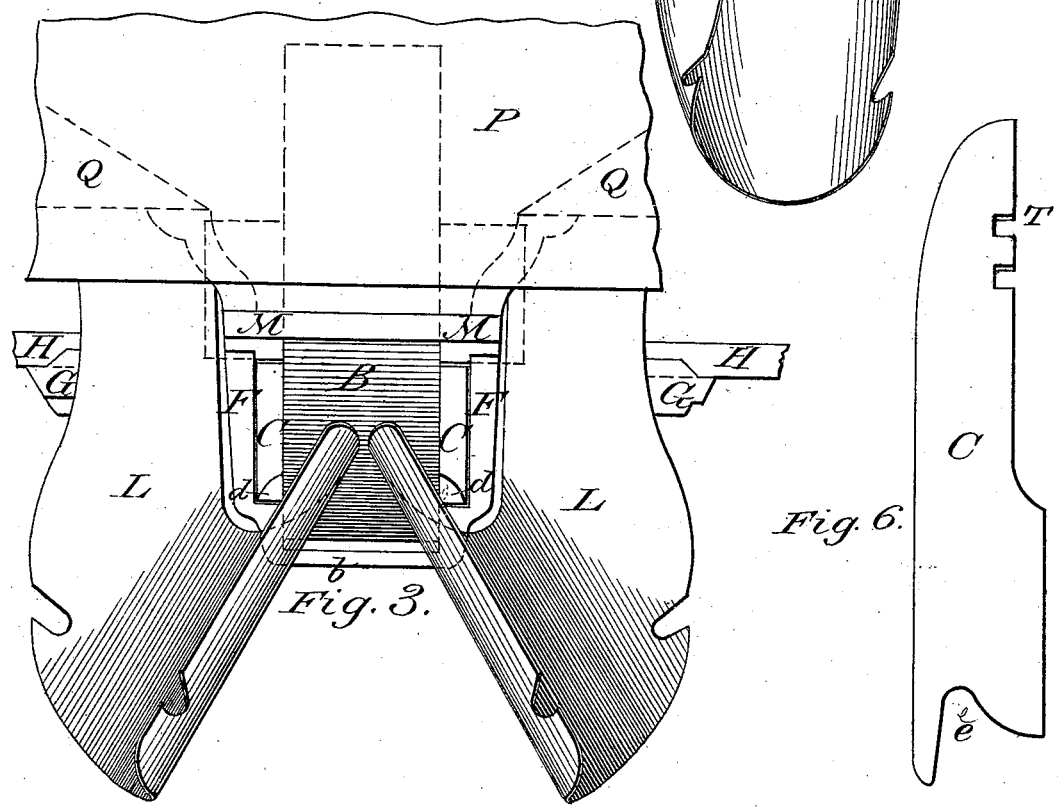
Attest:
J. S. Christie
Charles Rabbitts
Inventor:
Daniel Berlew 2 Sheets—Sheet 2.

D. BERLEW.
Feed-Cup for Grain-Drill.

No. 226,963. Patented April 27, 1880.

Attest:
J. S. Christie
Charles Rabbitts

Inventor:
Daniel Berlew

UNITED STATES PATENT OFFICE.

DANIEL BERLEW, OF SPRINGFIELD, OHIO.

FEED-CUP FOR GRAIN-DRILLS.

SPECIFICATION forming part of Letters Patent No. 226,963, dated April 27, 1880.

Application filed September 27, 1878.

*To all whom it may concern:*

Be it known that I, DANIEL BERLEW, of Springfield, county of Clarke, and State of Ohio, have invented a new and useful Improvement in Feed-Cups for Grain-Drills, of which the following is a specification.

My invention relates to seed or grain drills which are provided with cups or cases attached to the under side of the hopper, and in which variously-constructed feed-wheels rotate to force or discharge the seed or grain from the hopper to the ground.

In this class of grain-drills the feed-wheels are usually located low in their cases, with comparatively small openings above them for the influx of the grain. As a consequence of this construction the grain frequently arches over these openings and ceases to flow. It has also been found in most cases in this class of grain-drills that the devices for regulating the discharge-outlets are unreliable and do not work accurately, thereby causing loss to the farmer on account of leaving spots of land unseeded.

To remedy these difficulties is the object of my invention.

It consists, first, in such a construction and location of the feed-wheels that they act in the body of the grain within the hopper as agitators, by which means a steady and even discharge or flow is maintained and the ground uniformly covered with seed. At the same time I preserve in my construction all the requisites of a positive force-feed grain-drill.

Secondly, my invention consists in constructing the feed-wheel of two dish-shaped faces, and in providing, in connection therewith, two discharge-orifices, so that one wheel is made to perform the office of two and the parts necessary to the machine are diminished in number.

My invention consists, thirdly, in so constructing the gates, as hereinafter fully described, that when the cups are full of grain the grain will have no effect on the easy adjustment of the gates in regulating the size of the discharge-orifices.

My invention consists, further, in details of construction relating to the feed-wheel, the case, the discharge-orifice, and the mechanism for effecting the adjustment, all as hereinafter fully set forth, and particularly pointed out in the claims.

In carrying out my invention I so construct the feed-wheel within the cup that nearly half the wheel projects into the cup, whereby the wheel acts constantly to stir the body of the grain and causes it to flow freely toward the outlet. I also make the feed-wheels with a central opening, so that the grain may flow freely from both sides into the case.

The mode of construction of the wheel and its location in the box make it practical to have two feed-openings and two feed-faces for the same wheel. The periphery of the wheel itself forms the bottom of the case. The gates are arranged vertically against the open sides of the wheel and slide in horizontal guides in the side pieces of the lower part of the case. These gates are all moved by one bar sliding at right angles to the gates, with inclined ribs holding in grooves in the rear extension of said gates, whereby all the gates are moved simultaneously and with great accuracy, and are held in any position by the same mechanism which gives them motion. Where the double-faced wheel is used I provide spouts on each side inclined so as to guide the grain to its proper position.

Figure 7:
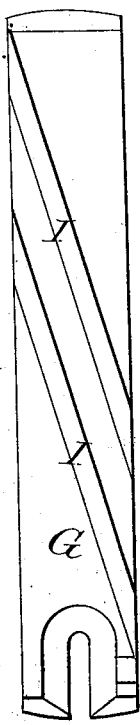
Figure 4:
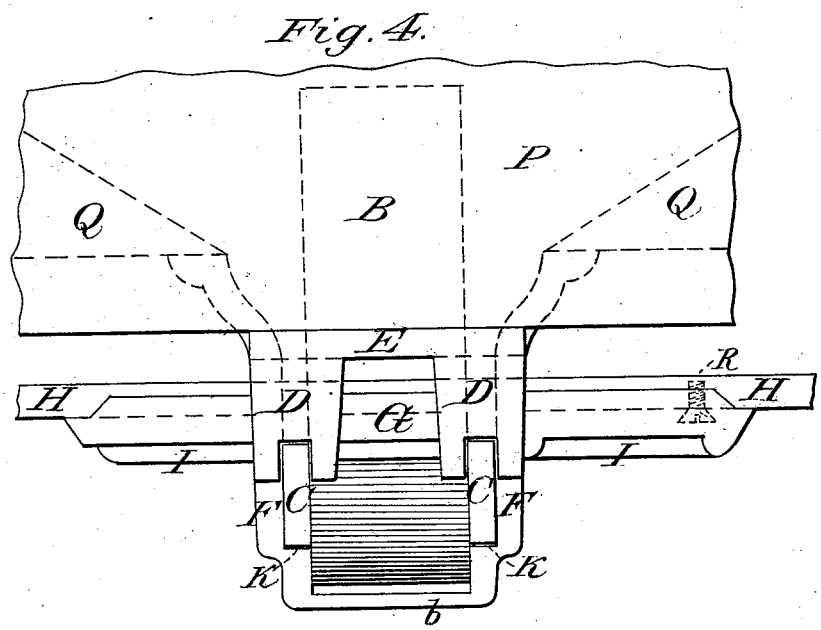
Figure 5:
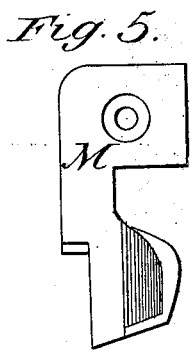
Figure 8:
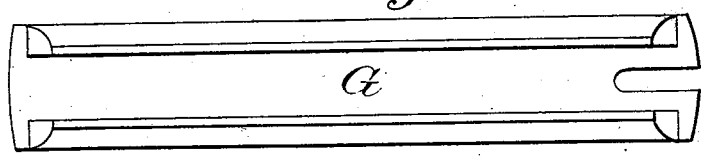

In the drawings which accompany this specification, Figure 1 is a side elevation of the cup, showing its connection with the hopper, the wheel, and the cells, the other parts being represented in their proper places. Fig. 2 is a section taken transversely of the wheel, centrally through its axis. Fig. 3 is a rear-end elevation, showing the spouts or conductors. Fig. 4 is a front elevation, showing the horizontal bar which operates the gates. Fig. 5 is a view of the deflector. Fig. 6 is a side elevation of the vertical gate. Fig. 7 is a bottom view of the ribbed plate which operates the gates, and Fig. 8 a top view of the same.

In these drawings, B represents the feed-wheel. It is represented as formed with two dish-shaped faces, though it will be understood that one is sufficient to illustrate the main features of my invention. The inner periphery of the wheel is provided with transverse feed-ribs $a\ a$. The wheel is mounted upon a shaft, N, which has its bearings in the two vertical case-sides F F. It projects up into the hopper, as shown plainly in Figs. 1 and 2 of the drawings, and as the upper part is thereby kept in the body of the grain it operates, when in motion, to stir the grain and prevent any arching of the grain over the opening by which it escapes from the hopper and to cause a steady, uniform flow of the grain to the ground.

The hopper is represented in part, its sides P P being broken above, but intended to extend to the ordinary height.

Central openings are formed in the wheel B, as shown at S S S, the wheel being supported on its hub by spokes, of which there may be any suitable number. Through the central openings the grain may flow to the orifice both from front and rear of the wheel. The lower part of the wheel moves in the case F F, which forms, with the periphery of the wheel, a closed box, except at the side or sides, where an adjustable opening (or openings) is provided for the escape of the grain. A bar, b, extends across underneath the case, connecting the sides thereof.

The flanges of the wheel form the bottom of the box, and the inclined inner ribbed surfaces constitute the force-feed of the apparatus, the ribs a a carrying the grain alone until it reaches the openings d d, Figs. 1 and 3, the motion of the wheel being indicated by the arrow in Fig. 1.

In order to prevent the grain from being carried up by the wheel past the discharge-orifice, I provide deflectors M, one on each side, when the doubled-faced wheel is used. These deflectors are fixed to the bottom edge of the side of the hopper by means of screws passing through the outer ends of the deflectors and through a plate, E. The deflectors extend into the dish-face of the wheel and hold the grain down against the inner ribbed surface of the flange. The flange inclines slightly outward, so that the grain tends to flow laterally to the openings d. The side plates of the case F F fit snugly against the edge or side of the wheel and completely inclose both sides when the wheel is made dish-shaped on both, except at the openings d. Manifestly, where only one side is so shaped, the wheel being single, the side of the case on the closed side of the wheel need not project down farther than is necessary to cover the central openings.

Recesses K K are formed in the inner faces of the vertical sides of the case F F, fitted to receive the vertically-arranged sliding gates C C, one for each side of the double wheel. These gates slide horizontally in the guideways, fitting snugly therein and closely against the sides of the feed-wheel. Their front ends are formed as shown at e, Figs. 1 and 6, the recess in the end forming the passage for the escape of the grain. The rear end of these gates are provided with a notch or notches, T, in which fit the flange or flanges I, fixed diagonally on a plate, G. This plate G is fastened to a bar, H, which extends across the machine and is moved longitudinally back and forth sufficiently to move the gates, all of which in the machine are connected to the said bar in the manner described. The bar H is arranged underneath the plate E and within lugs D, extending downward therefrom, as shown in Figs. 1 and 4.

A deflector, x, is fixed to the side of the hopper, on which the wheel descends in turning, to throw the grain aside, in order that it may not be crushed between the descending wheel and side of the hopper.

Guides L L conduct the grain from the exit-openings to any proper point. These may be of any suitable kind, and I do not limit myself to those shown; nor do I limit myself to the precise form of wheel or case.

Great advantage arises from the use of the double feed-wheel and double openings, as shown in the drawings, since the capacity of each wheel and case is thereby doubled; but the arrangement of the wheel within the hopper and the construction of the feeding-surfaces and of the box are equally applicable to a single wheel.

The arrangement of the feed-wheels and their cases upon the hopper, and the arrangement of the shaft n and construction of devices for moving it, are not essentially different from those heretofore used, and need not be particularly described.

Having thus described my invention, what I claim is—

1. In a feed for grain-drills, the described case F, closed on the sides and open below, in combination with a wheel whose flange or periphery forms the bottom of the case, substantially as set forth.

2. In combination with the case, the dish-shaped wheel having a central aperture, whereby grain may flow into the wheel from its rear as well as its front face.

3. The combination of a horizontal longitudinally-sliding rod, a vertical transverse gage, and adjustable actuating-plate provided with a diagonal rib or flange, whereby the gate may be adjusted and moved to open or close the discharge-outlets, as specified.

4. The combination, with the wheel projecting up into the hopper, of the deflector, as and for the purposes set forth.

5. The deflector M, connected to the bottom of the case, as shown, and fitted to the dish-shaped feed-wheel, as and for the purpose set forth.

6. The wheel B, having two dish-shaped faces provided with ribs a, adapted to rise into the lower part of the hopper, in combination with the case and duplicated gates and discharge-orifices, as set forth.

DANIEL BERLEW.

Witnesses:
J. S. CHRISTIE,
CHARLES RABBITTS.